United States Patent [19]

Gregg

[11] Patent Number: 4,819,223
[45] Date of Patent: Apr. 4, 1989

[54] VIDEO RECORD DISC
[75] Inventor: David P. Gregg, Los Angeles, Calif.
[73] Assignee: Discovision Associates, Costa Mesa, Calif.
[21] Appl. No.: 812,158
[22] Filed: Jul. 1, 1977

Related U.S. Application Data

[63] Continuation of Ser. No. 571,259, Apr. 29, 1975, abandoned, which is a continuation of Ser. No. 735,007, Jun. 6, 1968, abandoned.

[51] Int. Cl.⁴ .................... G01D 15/10; G11B 7/00
[52] U.S. Cl. .................. 369/275; 346/76 L; 428/64; 358/342; 369/61; 369/100; 369/109
[58] Field of Search .............. 274/41.6 R, 42 R; 179/100.3 V; 346/76 L; 340/173 LT, 173 LM; 428/64, 65; 358/128; 369/61, 100, 109, 275

[56] References Cited

U.S. PATENT DOCUMENTS 2,547,009  4/1951  Huston et al. .................. 177/380
3,175,196  3/1965  Lee et al. ..................... 346/76 L
3,256,524  6/1966  Stauffer ....................... 346/76 L
3,262,122  7/1966  Fleisher et al. ................ 346/1
3,287,563  11/1966  Clunis ......................... 179/100.3 V
3,530,258  9/1970  Gregg et al. ................... 179/100.3

Primary Examiner—Steven L. Stephan
Attorney, Agent, or Firm—Discovision Associates

[57] ABSTRACT

A transparent record disc is provided which may appropriately have video signals optically recorded thereon, the record is composed of a lamination, for example, of pliant transparent plastic on a base of hard transparent plastic. The base provides strength for the record and the pliant plastic permits the video recording to be impressed into the record by simple embossing means, rather than by stamping or molding by which the surface of the record is actually raised above its melting point and caused to flow. An improved process for forming the video recordings on the disc record is also provided.

17 Claims, 1 Drawing Sheet

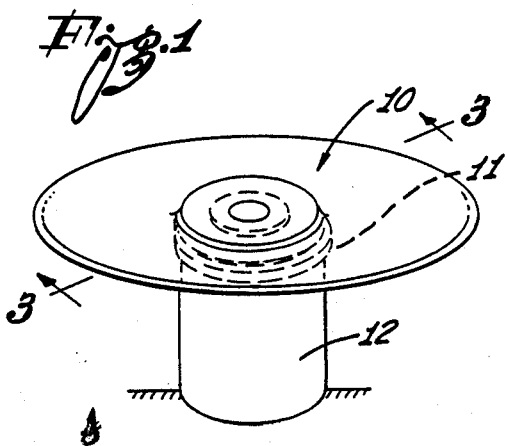
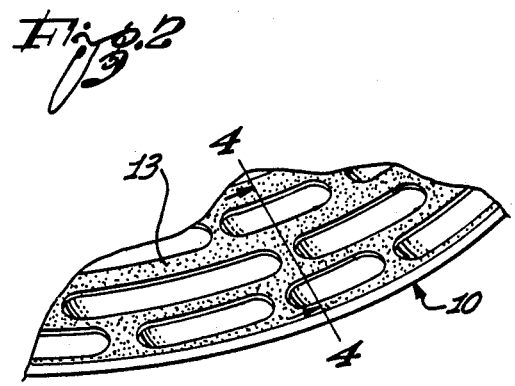
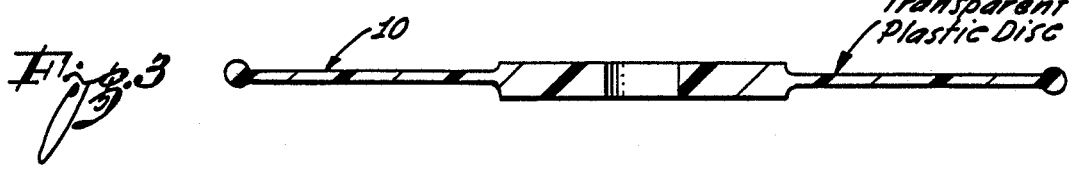
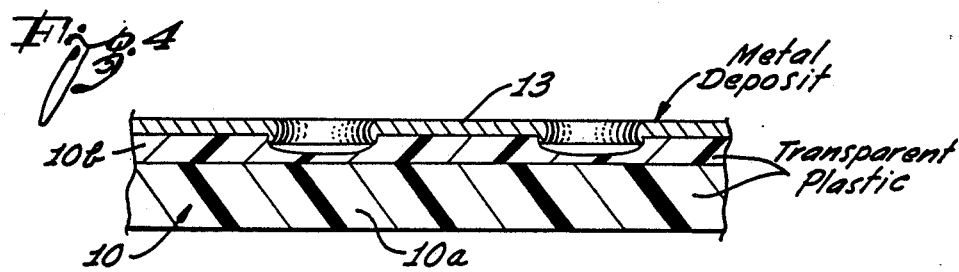
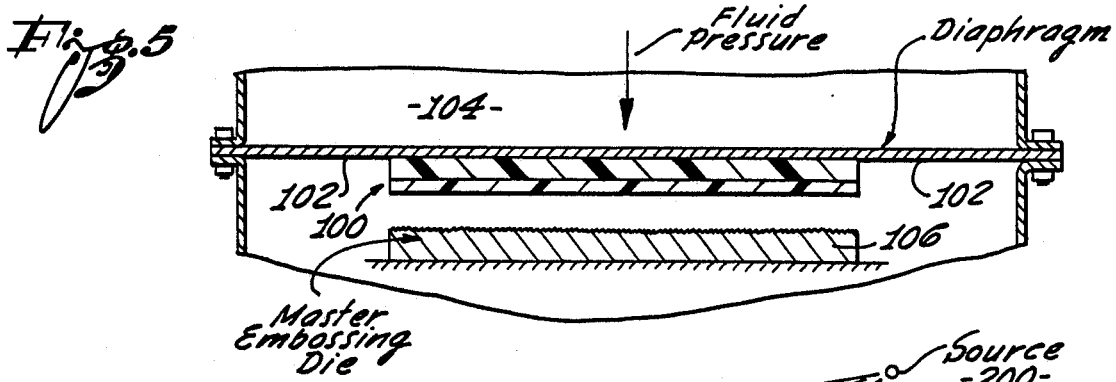
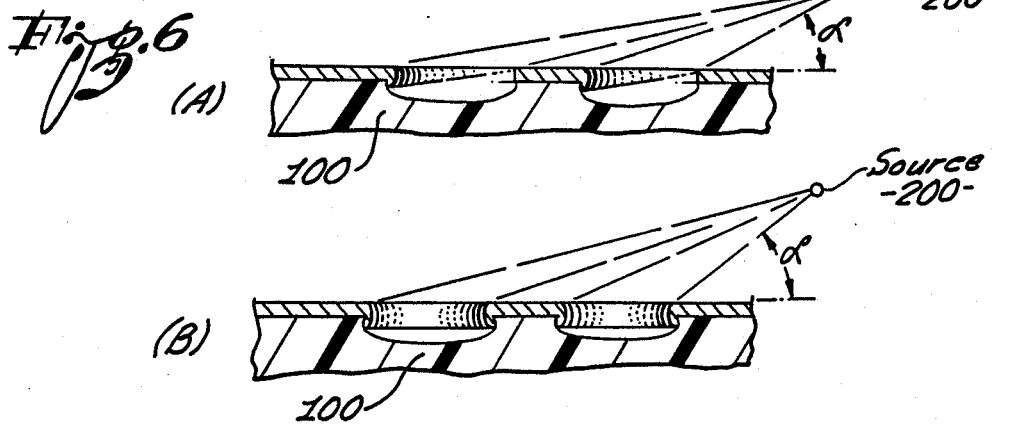

VIDEO RECORD DISC

This is a continuation of application Ser. No. 571,259, filed Apr. 24, 1975, now abandoned which is a continuation of application Ser. No. 735,007, filed June 6, 1968, now abandoned.

RELATED COPENDING APPLICATIONS

Ser. No. 507,474, filed Nov. 12, 1965 now abandoned; Ser. No. 627,701, filed Apr. 3, 1967 now U.S. Pat. No. 3,430,966; and Ser. No. 741,020 filed June 28, 1968, now U.S. Pat. No. 3,530,258.

BACKGROUND OF THE INVENTION

A transparent plastic disc is described in the Copending Application Ser. No. 627,701 now U.S. Pat. No. 3,430,966, issued Mar. 4, 1969 in which picture information in the form of video signals is recorded on one or both side of the disc. The recorded picture information on the disc is intended to be reproduced, for example, on a television receiver, by playing the disc on a turntable and by directing a light beam through the disc, as described in the Copending Application Ser. No. 507,474 now abandoned. The light beam is modulated by the video recordings on the disc, and a pick-up head is provided which responds to the resulting light signals to transform them into corresponding electrical video or picture signals for playback purposes.

The present invention is concerned with such a video disc record, and with a duplication process by which a multiplicity of such records may be mass-produced from a master record die. The process to be described, for example, is one in which the video information is embossed into one or both surfaces of the video disc record, rather than being stamped or molded into the surface. The material of the disc record surface is made such to be appropriate for embossing and to enable, under suitable temperature conditions, a slight force pressing the disc surface against a master die to cause the impressions on the surface of the die to be embossed into the surface of the disc. With such an embossing process, there is no transverse flow of the disc material, as occurs in the usual prior art stamping or molding processes, as are presently being used in the production of phonograph sound records, for example, and by which the actual surface of the record is raised above its melting point.

The stamping techniques presently being used in the manufacture of phonograph records are not suitable for the extraordinarily fine micro-grooves and patterns required by video frequency recordings of picture information. Such stamping techniques as are presently being used in the production of phonograph sound records require that the master record die be heated to a temperature above the melting point of the vinyl or other plastic material used in the phonograph record.

In the prior art phonograph record duplicating process, a "biscuit" of the vinyl or other plastic material is placed in a "stamper", and the heated master record die is brought down onto one or both surfaces of the biscuit. The plastic of the biscuit surface is melted and caused to flow radially into the spaces defined by the impressions on the master die surface. As mentioned above, this stamping technique by present day standards appears to be unsuited for the extremely fine micro-spiral grooves required for video frequency recordings.

As an alternative to the present day practice, and as will be described, a video disc record blank of laminated transparent plastic construction may be provided, the laminated record having a surface layer of relatively soft transparent plastic of any suitable known type, and which can be readily embossed; and a supporting base of a rigid plastic, such as an acrylic resin or polyvinyl chloride. As a first step in the alternate approach, the laminated disc record blank is heated to a point at which the surface tension of the surface material causes the surface to be smooth and regular. This temperature is the critical temperature at which embossed impressions may be formed on the disc surface, and it is below the melting point of the surface material.

The embossing die(s) is (are) heated to a temperature slightly above the critical temperature, and it (they) and the record blank are brought together with a slight pressure. As the die(s) and the record blank are brought together, the die(s) is (are) cooled to the aforesaid critical temperature, and its (their) surface impressions are embossed into the surface(s) of the record. Obviously, if two "sides" are being embossed, two embossing dies are required. The supporting structure would require modification, but such modification is well within the skill of the art.

After the disc record has been embossed, as described above, an opaque mask is deposited into the portions of its surface around the resulting embossed micro-grooves. This latter mask may be formed on the disc by using a vacuum deposition technique, as will be described.

The aforesaid disc record, when laminated in accordance with the aforesaid alternate approach, is used in order to present the desired surface characteristics for optimum embossing capabilities, and yet so that the record itself may be rugged and suitable for rough usage. The laminated structure of the record comprises reasonably tough and dimensionally stable clear plastic for the main body of the disc; and a plastic material on one or both surfaces of the disc which is most suited for embossing. The combination provides a video record disc which is useful, which can take an appropriate amount of handling, and which still can be embossed easily and effectively.

BRIEF DESCRIPTION OF THE DRAWINGS

FIG. 1 is a perspective representation of a disc which may be constructed in accordance with the concepts of the present invention, and by the process to be described, the disc being shown as mounted on an appropriate turntable;

FIG. 2 is a fragmentary representation of the disc shown in FIG. 1, on an enlarged scale;

FIG. 3 is a side section of the disc of FIG. 1, taken essentially along the line 3—3 of FIG. 1;

FIG. 4 is a section of the disc shown in FIG. 2, taken along the line 4—4 of FIG. 2;

FIG. 5 is a schematic representation showing the manner in which the impressions from a master die may be embossed into the surface of the disc record shown in FIGS. 1-4; and FIG. 6A and FIG. 6B show various steps in which a surface opaque layer may be deposited over selected portions of the embossed disc record.

DETAILED DESCRIPTION OF THE ILLUSTRATED EMBODIMENT

The apparatus shown in FIG. 1 includes a video disc record 10 which may be constructed in accordance with the concepts of the present invention, and which has video signals optically recorded thereon. The video signals are recorded on the disc 10, as will be described, in a recording track which extends as a micro-spiral from the outer periphery of the disc towards its center. The recording track on the disc 10 may have a width, for example, of the order of 1 micron, and the spacing between adjacent convolutions of the disc may also be of the order of 1 micron.

The video recording disc 10 is supported on a turntable 11 which, in turn, is rotatably driven by an electric motor 12. The motor 12 may rotate the turntable at a relatively high speed, for example, in the range of 900–3600 rpm.

The disc 10 may have a cross sectional configuration as shown, for example, in FIG. 3. A metallic deposit is placed over portions of the upper surface of the disc 10, as designated 13 in FIGS. 2 and 3. As will be described, the disc 10 may have a laminated structure, shown in FIG. 4, to be composed of a first portion 10a of a relatively hard transparent plastic, such as polyvinyl chloride; whereas the upper portion 10b may be of a relatively soft transparent plastic which may be suitably embossed with the aforesaid micro-grooves when the aforesaid alternate procedure is followed. The disc 10 may include a portion similar to the portion 10b of its opposite side, and so as to constitute a two-sided record, as described in the Copending Application Ser. No. 741,020, filed June 28, 1968 and now U.S. Pat. No. 3,530,258.

The metallic deposit 13 is selectively placed on the high relief portions of the surface of the layer 10b, after the surface has been embossed, so that the video recordings appear as discontinuous micro-grooves in which the transparency is retained, and which extend along a spiral recording track.

As mentioned above, the duplication process contemplated, by which plastic record discs are formed on a mass production basis from a master die, is one in which embossing or stamping may be used. In carrying out the embossing process, for example, and as shown in FIG. 5, a plastic blank disc 100 may be attached to a diaphragm 102 in a suitable compartment 104.

The disc 100 may be constructed in the manner described above, so as to have a surface layer of relatively soft plastic material. The disc 100 in the chamber is then heated by any appropriate means to a critical temperature T1, which is such that the surface tension of the material forming the surface layer of the disc 100 causes the surface to be smooth and regular.

A master embossing die 106 is also provided, and it is mounted in a fixed position facing the plastic disc 100. The master die is then heated to a temperature which is slightly above the aforesaid critical temperature. The diaphragm 102 is then removed by fluid pressure, or by a ram, to bring the disc 100 against the embossing face of the master die 106. The temperature of the die is cooled back to the critical temperature. When the pressure is removed from the diaphragm 102, the attached disc 100 is moved back from the die 106, with the impressions of the die being embossed on the surface of the disc; but without causing either abrasion of the embossing die, or loss of information due to surface tension of the plastic material. The use of diaphragm 102 prevents any minute side motion between the disc 100 and the die 106, as the disc is moved against the die, and vice versa.

If necessary, a slight vacuum pressure may be used at the end of the embossing operation to move the disc 100 back from the surface of the die 106. In addition, or as an alternative, electrostatic means may be used, the diaphragm 102 and master die 106 being metal, to cause these two members to move together and achieve the desired embossing action. For example, the master die 106 may be formed of tungsten steel, and the diaphragm 102 may be formed of nickel. Then, the two elements may be charged and discharged electrostatically, so as to bring the disc 100 against the face of the die 106, and subsequently to move the disc away from the die.

After the disc 100 has been embossed with the video information, for example, by the duplication process and apparatus of FIG. 5, a metal, or other opaque mask, is deposited onto the surfaces above the embossed micro-grooves which are formed in the surface of the disc. As mentioned above, a method of achieving this is to use vacuum deposition and a shadow mask technique, as shown schematically in FIGS. 6A and 6B.

As shown in the schematic sketches of FIGS. 6A and 6B, the disc 100 is considered to be mounted on a suitable turntable in a vacuum deposition chamber. The source(s) of the radiated metal 13, such as aluminum, designated 200, is (are) offset from the center of the disc 100 and raised slightly above its surface, as shown. The angle formed between the surface of the disc 100 and of the radiated metal is designated $a$ in FIGS. 6A and 6B. If this angle is fairly small, then the radiated metal will be formed on the upper sides of the embossed grooves, first on one side as shown in FIG. 6A, and then continuously around to the other side, as the record rotates, as shown in FIG. 6B. Therefore, as the metal deposition process continues and as the record 100 rotates, a thin coating of metal will be formed over the top edges of the micro-grooves, and also on the upper lands and other high relief areas of the disc surface(s).

That is, if the disc 100 is held on a turntable, and if the turntable holding the disc is slowly turned, then on the first half revolution, and as shown in FIG. 6A, all the inside edges of the grooves will receive one coating of metal on the half furthest from the source. Then, when the record has gone through the next half revolution, both sides of the grooves will have received a continuous coating of metal around the edges of all the grooves, as shown in FIG. 6B. As the process continues through several revolutions, the corners of the metal deposit sharpen, and provides a uniform opaque metal layer over the high relief areas of the disc surface. The process has the feature of increasing the optical contrast ratio by the presence of the metal, and by the fact that the grooves themselves are not coated at their bottoms. In the finished disc, the surface has, arranged in a concentric spiral, deformities or discontinuities which are out of the plane of the surface and which deformities or discontinuities modulate impinging radiant energy to apply the information recorded on the disc to the radiant energy.

While a particular structure and process has been described, modifications may be made. It is intended to cover all modifications in the ensuing claims.

What is claimed is:

1. A master die member for transferring surface impressions carried by the die member to a finished video disc member, said die member comprising:

a die member having a body and including an impression carrying surface;

said impression carrying surface including a first, continuous surface member which is planar in form;

said impression carrying surface further including a plurality of spaced, raised, second members extending away from the plane of the first surface member and terminating in a second common plane;

said second members being integrally formed with said body;

said impression carrying surface having a center point, and said impression carrying surface terminates at an outer periphery;

said second members being sequentially arranged in a spirally shaped video information track;

each of said second members having a uniform width for defining the width of said information track;

each of said second members having a variable length which lies in the direction of the information track; and the length of an individual second member cooperates with the length of an adjacent portion of said first surface which lies in the information track to represent video information signals.

2. A master die member as recited in claim 1, wherein:

said information track extends from adjacent said outer periphery of said impression carrying surface and continues to said center.

3. A master die member as recited in claim 2 wherein said information track begins adjacent said outer periphery and extends toward said center of said die.

4. A video disc record for storing an analog information signal, comprising:

a unitary body formed as a homogeneous single member having an uninterrupted, substantially planar surface formed with a plurality of separate, discrete, successively positioned, and discontinuous deformities departing directly from said planar surface, said deformities terminating in a common plane displaced from said planar surface;

said deformities being arranged in a spiral form, with undisturbed planar surface portions surrounding each of said deformities;

said deformities having at least substantially straight sides at the intersection of each said deformity and said planar surface and a substantially uniform width and having continuously-variable length representative of the stored analog information signal; and an opaque coating formed on at least said planar surface.

5. A video disc record as recited in claim 4, wherein said opaque coating provides an increased contrast ratio to an impinging light beam when compared to said deformities.

6. A video disc record as recited in claim 5, wherein said opaque coating comprises a metal.

7. A video disc record as recited in claim 4, wherein:

the video disc record further includes a supporting base composed of a relatively rigid, plastic material;

the unitary body is composed of a relatively soft, plastic material; and the unitary body overlays the supporting base to form a laminated structure.

8. A video disc record as recited in claim 4, wherein the opaque coating is formed only on the planar surface portion of the unitary body.

9. An information storage member of a type having an analog information signal optically represented thereon, for reading by an impinging light beam, the information storage member comprising:

a unitary body formed as a homogeneous, single member;

said body having a succession of alternately-positioned micro-grooves and high relief portions arranged in a spiral-shaped information track having a plurality of turns;

each of said high relief portions terminating in a planar surface and lying within a first plane;

each of said micro-grooves terminating in a second plane spaced from said first plane; and each of said micro-grooves having at least substantially straight sides extending in the circumferential direction at the intersection of each said microgroove and said planar surface and a substantially uniform width corresponding to the width of the information track, and a continuously-variable length representative of the stored analog information signal.

10. An information storage member as recited in claim 9, wherein:

said high relief portions in one turn of said spiral-shaped information track are joined with the high relief portions in an adjacent turn of said spiral-shaped information track by an additional, intermediate high relief region for surrounding said micro-grooves; and said intermediate high relief region is employed as an intertrack area for separating adjacent turns in said spiral-shaped information track.

11. An information storage member as recited in claim 9, and further comprising:

an opaque metal layer formed at least on said high relief portions for reflecting the light in the impinging light beam and for increasing the optical contrast ratio of an impinging light beam between said high relief portions and said micro-grooves.

12. An information storage member as recited in claim 11, wherein the opaque metal layer is formed only on the high relief portions of the unitary body.

13. An information storage member as recited in claim 9, wherein:

the storage member further includes a supporting base composed of a relatively rigid, plastic material;

the unitary body is composed of a relatively soft, plastic material; and the unitary body overlays the supporting base to form a laminated structure.

14. A disc-shaped record for carrying analog information in a form suitable for being sensed by an impinging light beam, said record comprising:

a unitary structural member for use as an information storage member, said member having a first surface and a second surface;

said first surface carrying the analog information in the form of a spiral-shaped track having a plurality of individual turns, each of said turns being separated from an adjacent one of said turns by an intertrack portion of said first surface;

said spiral-shaped track being formed by a plurality of alternately-positioned first and second regions arranged in sequential order, said first and second regions providing first and second levels of light sensed therefrom, respectively, in response to the impinging light beam;

each of said first regions being coplanar with said intertrack portions of said first surface, and each of said first regions being positioned intermediate a pair of said second regions;

each of said second regions being a curvilinear discontinuity projecting out of the plane of said first regions;

each discontinuity having a substantially constant dimension in the radial direction of the disc-shaped record and a substantially constant maximum dimension in the direction perpendicular to said first surface;

each discontinuity having at least substantially straight sides extending in the circumferential direction at the intersection of each said discontinuity and said first surface; and the length of each discontinuity in the circumferential direction of the disc-shaped record and the distance between adjacent discontinuities in the circumferential direction of the disc-shaped record representing the stored analog information.

15. A disc-shaped record for carrying analog information in a form suitable for being sensed by an impinging light beam, said record comprising:

a unitary structural member for use as an information storage member, said member having a first surface and a second surface;

said first surface carrying the analog information in the form of a spiral-shaped track having a plurality of individual turns, each of said turns being separated from an adjacent one of said turns by an intertrack portion of said first surface;

said spiral-shaped track being formed by a plurality of alternately-positioned first and second regions arranged in sequential order, said first and second regions providing first and second levels of light sensed therefrom, respectively, in response to the impinging light beam;

each of said first regions being coplanar with said intertrack portions of said first surface, and each of said first regions being positioned intermediate a pair of said second regions;

each of said second regions being a curvilinear discontinuity projecting out of the plane of said first regions;

each discontinuity having at least substantially straight sides extending in the circumferential direction at the intersection of each said discontinuity and said first surface and a substantially constant dimension in the radial direction of the disc-shaped record and a substantially constant maximum dimension in the direction perpendicular to said first surface;

the length of each discontinuity in the circumferential direction of the disc-shaped record and the distance between adjacent discontinuities in the circumferential direction of the disc-shaped record representing the stored analog information; and a reflecting film formed on at least said first regions and said intertrack regions for enhancing the optical contrast ratio between said first and said second light levels from said planar portions and said discontinuities, respectively.

16. A disc-shaped record for carrying analog information in a form suitable for being sensed with an impinging light beam, said record comprising:

a unitary structural member for use as a storage member, said member having at least a first surface;

said first surface carrying the analog information in the form of a spiral-shaped track having a plurality of individual turns, each of said turns being separated from an adjacent one of said turns by an intertrack portion of said first surface;

said spiral-shaped track being formed by a plurality of alternately-positioned first and second regions arranged in sequential order, said first and second regions providing first and second levels of light sensed therefrom, respectively, in response to the impinging light beam;

each of said first regions being coplanar with said intertrack portions of said first surface, and each of said first regions being positioned intermediate a pair of said second regions;

each of said second regions being a curvilinear discontinuity projecting out of the plane of said first regions;

each of said discontinuities terminating at a second planar surface parallel to and spaced from said first planar surface;

each discontinuity having at least substantally straight sides extending in the circumferential direction at the intersection of each said discontinuity and said first surface and a substantially constant dimension in the radial direction of the disc-shaped record;

the length of each discontinuity in the circumferential direction of the disc-shaped record and the distance between adjacent discontinuities in the circumferential direction direction of the disc-shaped record representing the stored analog information in the form of a pulse length modulated signal; and a reflecting film formed on at least said first regions and said intertrack regions for enhancing the optical contrast ratio between said first and said second light levels sensed from said planar portions and said discontinuities respectively.

17. A disc-shaped record for carrying analog information in a form suitable for being sensed by an impinging light beam, said record comprising:

a unitary structural member for use as an information storage member, said member having a first surface and a second surface;

said first surface carrying the analog information in the form of a spiral-shaped track having a plurality of individual turns, each of said turns being separated from an adjacent one of said turns by an intertrack portion of said first surface;

said spiral-shaped track being formed by a plurality of alternately-positioned first and second regions arranged in sequential order, said first and second regions providing first and second levels of light sensed therefrom, respectively, in response to the impinging light beam;

each of said first regions being coplanar with said intertrack portions of said first surface, and each of said first regions being positioned intermediate a pair of said second regions;

each of said second regions being a curvilinear discontinuity projecting out of the plane of said first regions;

each discontinuity having at least substantially straight sides extending in the circumferential direction at the intersection of each said discontinuity and said first surface and a substantially constant dimension in the radial direction of the disc-shaped record and a substantially constant maximum dimension in the direction perpendicular to said first surface;

the length of each discontinuity in the circumferential direction of the disc-shaped record and the distance between adjacent discontinuities in the circumferential direction of the disc-shaped record representing the stored analog information in the form of a frequency modulated signal; and a reflecting film formed on at least said first regions and said intertrack regions for enhancing the optical contrast ratio between said first and said second light levels sensed from said planar portions and said discontinuities, respectively.

* * * * *

UNITED STATES PATENT AND TRADEMARK OFFICE
CERTIFICATE OF CORRECTION

PATENT NO. : 4,819,223

DATED : April 4, 1989

INVENTOR(S) : David P. Gregg

It is certified that error appears in the above-identified patent and that said Letters Patent is hereby corrected as shown below:

Column 1, line 25, after "507,474" add --,--.

Column 1, line 25, after "abandoned" add --, and its continuation-in-part application, now U.S. Patent Number 3,530,258--.

Column 4, line 1, after "use of" add --the--.

Column 4, line 51, delete "provides" and insert --provide--.

Column 4, line 56, begin a new paragraph.

Column 8, line 27, delete "substantally" and insert --substantially--.

Column 8, line 36, delete "direction".

Signed and Sealed this

Third Day of April, 1990

Attest:

HARRY F. MANBECK, JR.

*Attesting Officer*     *Commissioner of Patents and Trademarks*